United States Patent
Desai et al.

(10) Patent No.: US 7,021,217 B2
(45) Date of Patent: Apr. 4, 2006

(54) VERSATILE CAVITY ACTUATOR AND SYSTEMS INCORPORATING SAME

(75) Inventors: Amish Desai, Altadena, CA (US); Ravi Kant Verma, Pasadena, CA (US); Massimo Antonio Sivilotti, Sierra Madre, CA (US)

(73) Assignee: Tanner Research, Inc., Pasadena, CA (US)

( * ) Notice: Subject to any disclaimer, the term of this patent is extended or adjusted under 35 U.S.C. 154(b) by 217 days.

(21) Appl. No.: 10/405,338

(22) Filed: Apr. 1, 2003

(65) Prior Publication Data

US 2003/0192997 A1   Oct. 16, 2003

Related U.S. Application Data

(60) Provisional application No. 60/372,251, filed on Apr. 11, 2002.

(51) Int. Cl.
*F42B 3/10*       (2006.01)
(52) U.S. Cl. .................. 102/202.5; 102/202.9; 102/205; 102/275.11; 280/741
(58) Field of Classification Search ............ 102/202.5, 102/202.7, 202.9, 205, 275.11; 280/741
See application file for complete search history.

(56) References Cited

U.S. PATENT DOCUMENTS

| | | | |
|---|---|---|---|
| 6,105,503 A * | 8/2000 | Baginski ................... | 102/202.5 |
| 6,553,914 B1 * | 4/2003 | Hosey et al. ............... | 102/530 |
| 6,598,532 B1 * | 7/2003 | Gerard et al. ............ | 102/202.5 |
| 6,619,692 B1 * | 9/2003 | Van Wynsberghe et al. ..... | 280/741 |
| 2002/0096078 A1* | 7/2002 | Goosen et al. ........... | 102/202.5 |
| 2003/0010243 A1* | 1/2003 | Roller ..................... | 102/202.5 |
| 2003/0114789 A1* | 6/2003 | Haar et al. ..................... | 604/69 |

* cited by examiner

Primary Examiner—J. Woodrow Eldred

(57) ABSTRACT

A versatile cavity actuator. The versatile cavity actuator includes a cavity having one or more polymer-based sidewalls. An energetic material is disposed therein. A heater is disposed on or within the cavity. In a specific embodiment, the cavity includes a thermally insulating base positioned beneath the heater, which is positioned near the bottom of the cavity. The polymer-based sidewalls are constructed from a photo-curable epoxy, which is disposed on a substrate via microelectromechanical processes. The sidewalls are angled or parabolic and are constructed via a low-temperature lithographic spin process compatible with post integrated circuit processing.

7 Claims, 4 Drawing Sheets

VERSATILE CAVITY ACTUATOR AND SYSTEMS INCORPORATING SAME

CLAIM OF PRIORITY

This application claims priority from U.S. Provisional Patent Application Ser. No. 60/372,251, filed Apr. 11, 2002, entitled INTEGRATED POLYMER MICRO CAVITIES WITH INITIATORS FOR ENERGETIC APPLICATIONS, which is incorporated by reference herein.

BACKGROUND OF THE INVENTION

1. Field of Invention

This invention relates to energetic cavities. Specifically, the present invention relates to miniature cavities equipped with energetic material.

2. Description of the Related Art

Miniature cavities, such as explosives-filled microcavities and nanocavities, are employed in various demanding applications including micro thrusters, safe-and-arm devices, and airbag initiators. Such applications require versatile, highly controllable, and cost-effective cavities with specific blast characteristics.

Some existing microcavity actuators include explosives-filled cavities etched in silicon. A polysilicon bridge wire detonator is often positioned on top of the explosives-filled microcavity. Bridge wires are resistive heating wires designed to detonate an accompanying charge disposed in a microcavity actuator. The bridge wires require precise positioning relative to the charge to ensure detonation. Accurate and expensive manufacturing processes are often required to ensure precise positioning of the charge relative to the heater. These stringent positioning requirements may increase actuator costs and dud rates.

Conventional silicon-based microcavity actuators, which are often called initiators or thrusters, depending on their application, often require relatively high-temperature manufacturing processes. Consequently, temperature-sensitive applications, such as integrated circuit applications, are often incompatible with the microcavity actuators. Furthermore, these microcavity actuators often require a rigid silicon substrate, which severely limits actuator versatility and applicability. In addition, requisite construction materials and microcavity processing steps often necessitate vertical cavity sidewalls. Vertical cavity sidewalls may yield undesirable blast characteristics for some applications.

To enhance blast characteristics, a cavity lined with a conductive heater may be employed, as disclosed in U.S. Pat. No. 6,105, 503, by Baginski, issued Aug. 22, 2000, entitled ELECTRO-EXPLOSIVE DEVICE WITH SHAPED PRIMARY CHARGE. However, device design constraints necessitate a rigid silicon substrate, which may require either expensive reactive ion etching or high-temperature manufacturing steps that are incompatible with many applications. Furthermore, these cavities typically require an electrical path through the substrate, which is problematic, especially in applications requiring special substrates, such as Integrated Circuit (IC) applications.

Hence, a need exists in the art for a versatile, reliable, and cost-effective cavity actuator that is suitable for use with various substrates, including temperature-sensitive substrates, and provides optimum blast characteristics for a given application. There exists a further need for efficient systems enabled by these miniature cavities.

SUMMARY OF THE INVENTION

The need in the art is addressed by the versatile cavity actuator of the present invention. In the illustrative embodiment, the inventive cavity actuator is adapted for use with microcavity initiator applications. The device includes a cavity having one or more polymer-based sidewalls. An energetic material is disposed in the cavity, and a heater is disposed on, within, or adjacent to the cavity.

In a more specific embodiment, the cavity further includes a thermally insulating base positioned beneath the heater, which is positioned near the bottom of the cavity. The polymer-based sidewalls are constructed from a photocurable epoxy disposed on a substrate via microelectromechanical processes. The sidewalls are angled or parabolic and are constructed via a low-temperature lithographic spin process compatible with post integrated circuit processing.

In one illustrative embodiment, the initiator includes a heater having plural heating conductor paths, which include necked-down bow-tie sections. The cavity actuator includes a microcavity constructed via a special microelectromechanical process characterized by processing temperatures sufficiently low to enable the cavities to be placed on or incorporated within integrated circuits. The heater includes a sidewall resistor positioned within the cavity to provide desired energetic material blast and/or burn characteristics.

In another illustrative embodiment, an array of the cavity actuators is disposed about an axis. The array is disposed on a conformal skin to facilitate projectile guidance. Each of the cavity actuators of the array may electrically communicate with a controller that selectively actuates the cavity actuators to produce a desired moment about the axis.

The novel design of the present invention is facilitated by use of a polymer to form microcavity sidewalls. Use of the polymer in combination with unique processing techniques enables other beneficial features, such as high cavity aspect ratios, angled walls, parabolic walls, low-temperature processing, versatility of forming on flexible substrates, and so on.

DESCRIPTION OF THE INVENTION

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
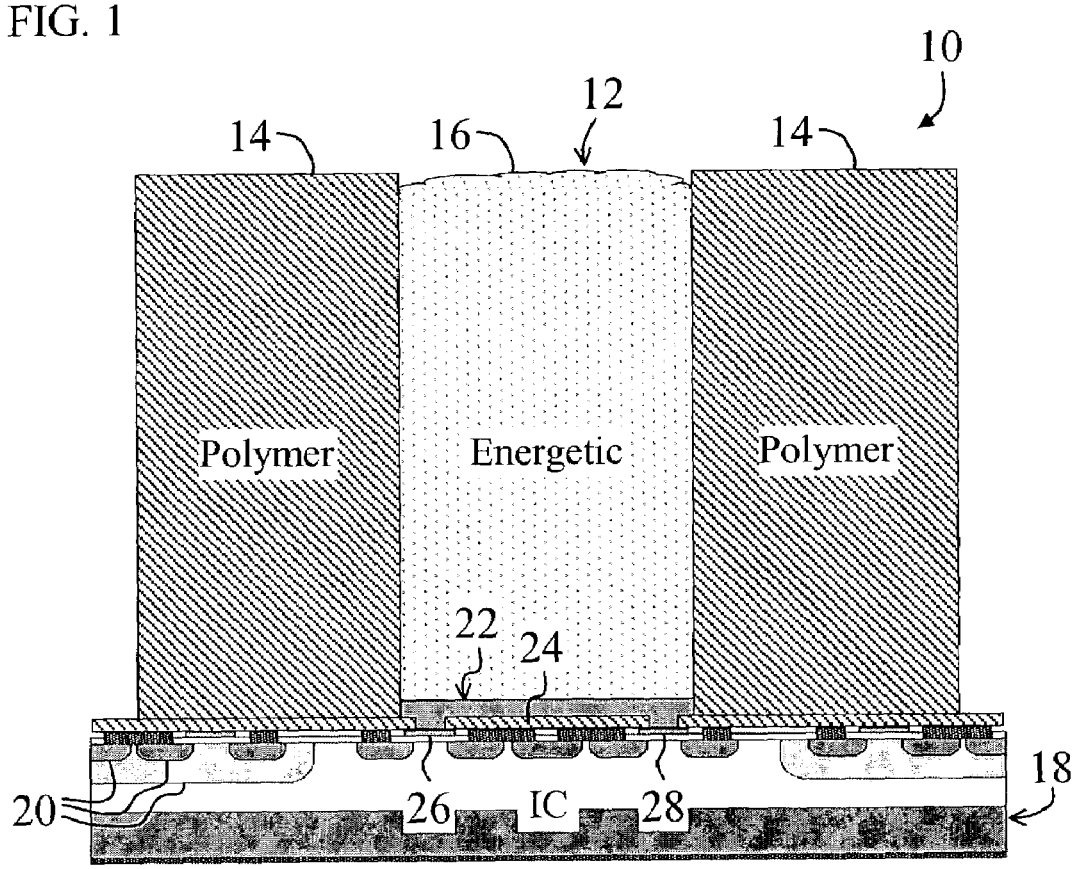
FIG. 1 is a diagram of a first embodiment of a microcavity actuator mounted on an integrated circuit and constructed in accordance with the teachings of the present invention.

FIG. 1 is a diagram of a first embodiment of a microcavity actuator 10 constructed in accordance with the teachings of the present invention and mounted on an Integrated Circuit (IC) 18. For clarity, various well-known components, such as power supplies, contact pads, and so on, have been omitted from the figures, however those skilled in the art with access to the present teachings will know which components to implement and how to implement them to meet the needs of a given application.

For the purposes of the present discussion, a microcavity actuator is any miniature cavity actuator, such as an initiator or thruster. For example, cavity initiators with dimensions on the order of nanometers or millimeters are also microcavity actuators. Cavity actuators are often called Electro-Explosive Devices (EED's).

The microcavity actuator 10 includes a cavity 12 having electrically and thermally insulating polymer sidewalls 14 and energetic material 16, such as explosives, disposed therein. For the purposes of the present discussion, energetic material is any material designed to burn or explode upon sufficient heating or shock by an initiating heater.

The energetic-filled cavity 12 is formed atop the integrated circuit 18, which includes temperature-sensitive doped regions 20. The bottom of the cavity 12 is equipped with a special multi-bow-tie heater 22 that is employed to selectively detonate the energetic 16. An insulator 24, which may be formed from similar polymer materials as the sidewalls 14, is disposed beneath the heater 22. The insulator 24 has openings through which heater 22 is connected to an anode conductor 26 at one end and a cathode conductor 28 at another end.

In the present specific embodiment, the polymer sidewalls 14 are constructed from a thermally insulating material. For the purposes of the present discussion, a thermally insulating material is a material that has a thermal conductivity defined by Fourier's law of less than 10 J/(s·m·K) at a temperature of 20° C. For example, the polymer sidewalls 14 and the insulator 24 may be constructed from insulating photo-curable epoxy, such as SU-8 epoxy.

In operation, a voltage sufficient to heat the heater 22 to cause detonation of the energetic 16 in the cavity 12 is selectively applied across the anode 26 and the cathode 28. The energetic 16 contains sufficient oxygen to enable detonation from the bottom of the cavity 12. The energetic 16 may be disposed in the cavity 12 via piezo-jet techniques by one skilled in the art, without undue experimentation.

The ratio of the height to the width of the cavity 12, i.e., the aspect ratio, is relatively high. Use of the polymer sidewalls 14 in combination with manufacturing techniques according to the teachings of the present invention enable arbitrarily high cavity aspect ratios. High aspect ratios result in different cavity blast characteristics, such as more directional blasts and shock waves, which are desirable in certain applications. High aspect ratios are particularly useful in thruster applications. Conventional manufacturing techniques and materials limit conventional microcavity actuator form factors, making the microcavity actuators impractical for various applications.

The heater 22 may be positioned in locations other than the bottom of the cavity 12 without departing from the scope of the present invention. For example, in certain thruster applications, the heater 22 is placed on top of the cavity 12 so that the energetic is lit from the top. In thruster applications, an energetic that has appropriate burn properties, rather than explosive properties, is employed. Furthermore, in thruster applications, the polymer 14 is coated with special heat-reflecting or heat-shielding materials, such as heat-resistant polymer (i.e. polyimides), to prevent or reduce softening or degradation of the polymer 14 and/or to maintain a form factor of the polymer sidewalls 14 after the polymer sidewalls 14 melt. The selected coating should be relatively resistant to thermal shock failure. The exact coating type and thermal properties thereof are application-specific and may readily be determined by one skilled in the art to meet the needs of a given application.

Use of the polymer 14 to form the cavity 12 enables various efficient relatively low-temperature manufacturing processes, which are adaptable to virtually any substrate, such as flexible or conformal substrates. For the purposes of the present discussion, low temperature manufacturing processes are preferably conducted below approximately 150° C.

The microcavity actuator 10 is formed by first disposing and patterning the insulator 24, if required for the given application, on the substrate 18 via low-temperature processes. This patterning may be performed via known lithographic techniques. Metal is then disposed over the substrate 18 and insulator 24 via low-temperature sputtering or other techniques. The metal is then patterned, such as via positive or negative photoresist techniques, to form the heater 22 and conductors 26, 28. When certain etch-resistant metals are employed, photoresist lift-off patterning techniques, rather than direct etching, may be employed to pattern the metal.

Alternatively, in certain applications, especially in applications wherein the metal conductors 26 and 28 are disposed atop the sidewalls 14, the microcavity actuator 10 is formed by first coating a substrate, such as the IC 18, with a thermally resistant polymer. The polymer is then patterned via photoresist techniques, polymer embossing, or other techniques, to form the sidewalls 14 and insulator 24. The microcavity actuator 10 is then coated with metal via low-temperature techniques, such as sputtering. The metal is then patterned, such as via positive or negative photoresist techniques to form the heater 22 and conductors 26, 28.

Use of the polymer sidewalls 14 to form the cavity 12, instead of creating pits in silicon, affords significant, unobvious advantages. Namely, the microcavity actuator 10 may be formed on virtually any substrate, such as flexible circuits and conformal layers; only low-temperature, atmospheric pressure, non-plasma processes are involved, thereby enabling formation of the actuator 10 on temperature-sensitive and shock-sensitive substrates, such as the IC 18; cavity form factor versatility is enhanced, such that large aspect ratios and various sidewall shapes are now achievable; and the insulating properties of the polymer sidewalls 14 help to conserve blast energy and prevent excess heat from escaping and inadvertently damaging the substrate 18.

Use of a polymer, such as SU-8 epoxy, for microcavity initiator sidewalls is particularly unobvious, since degradation point of the epoxy is typically less than the blast temperature. Conventional wisdom maintains that epoxies and other heat-resistant polymers are incompatible with energetic applications, since such materials often have relatively low melting points and would melt if used in energetic applications, thereby yielding poor blast and shock wave characteristics.

However, the softening of the epoxy is a time dependent process with a time constant greater than that of the blast itself. The epoxy SU-8, which is employed for the polymer sidewalls 14 in the present embodiment and has a relatively low degradation point, is an excellent electrical and thermal insulator and may prevent blast energy from being lost as heat via thermal conduction in the substrate.

Figure 2:
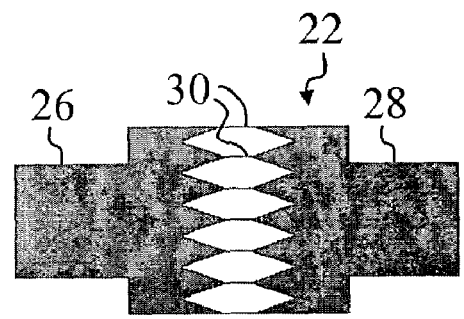
FIG. 2 is a top view of the multi-bow-tie heater of the microcavity actuator of FIG. 1.

FIG. 2 is a top view of the multi-bow-tie heater 22 of FIG. 1. Plural necked-down conductor sections 30 connect the anode 26 and the cathode 28, forming multiple parallel bow-tie sections. Those skilled in the art will appreciate that the anode 26 and cathode 28 may be switched without departing from the scope of the present invention.

In operation, sufficient voltage differential is applied between the conductors 26 and 28 to cause the necked-down sections 30 to heat sufficiently to ignite adjacent energetic (see FIG. 1). The exact dimensions of the necked-down sections 30 are application-specific and depend on the type of conductor employed. One skilled in the art may choose the dimensions to obtain a desired resistance, which will result in a desired heating upon application of sufficient voltage.

The resistance of a wire is proportional to the length of the wire and inversely proportional to the cross-sectional area, with a proportionality constant called the resistivity of the material. Thus, thinner wires have higher resistance, and consequently, dissipate more power as heat, since power dissipated by a resistor is $i^2R$, where i is the current flowing through the resistor, and R is the resistance.

Use of the multi-bow tie heater 22 may improve detonation reliability over that of a conventional bridge wire. The multiple necked-down sections 30 provide a wider area over which energetic may be deposited to facilitate detonation. For example, if an inaccurate energetic deposition method is employed, and only one of the necked-down sections 30 contacts the energetic, the energetic may still be detonated. Conventionally, more precise placement of the energetic relative to a bridge wire was required to ensure detonation, which increased manufacturing costs and dud rates. Furthermore, dimensions of the spaces between the necked down sections 30 and the dimensions of the necked-down sections 30 themselves may be chosen so that air pockets form in the spaces between the necked-down sections 30, which may facilitate energetic detonation.

Figure 3:
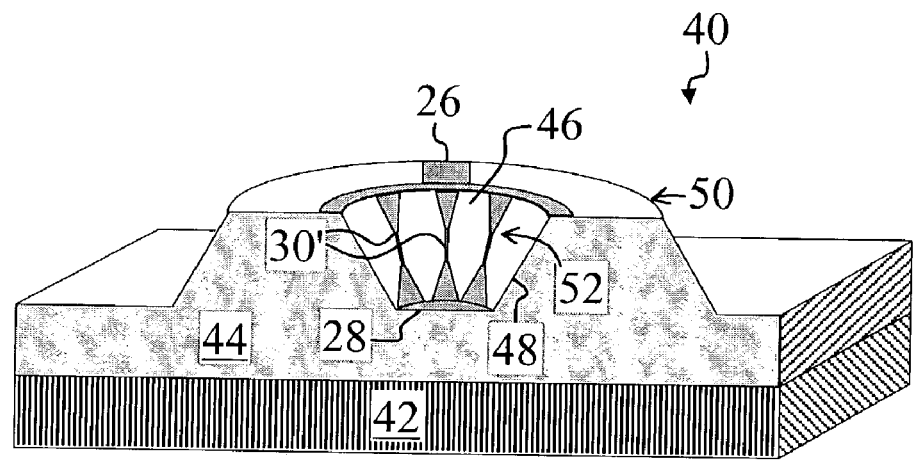
FIG. 3 is a diagram of a second embodiment of a microcavity actuator employing a unique side-wall heater and having angled polymer sidewalls constructed in accordance with the teachings of the present invention.

FIG. 3 is a diagram of a second embodiment of a microcavity actuator 40 employing a unique side-wall heater 52 and having angled polymer sidewalls 48 constructed in accordance with the teachings of the present invention. The microcavity actuator 40 is formed on a substrate 42, such as glass, conformal plastic, a temperature-sensitive IC, or other substrate. The microcavity actuator 40 is formed in a polymer 44 that is disposed on the substrate. A partially conical cavity 46 has angled sidewalls 48 that are supported by a raised portion 50 of the polymer 44. Other cavity shapes, such as rectangular or square cavities with one or more angled sidewalls, may be employed without departing from the scope of the present invention.

The cavity 46 is equipped with the unique angled sidewall heater 52, which includes multiple angled bow-tie sections 30'. The angled bow-tie sections 30' are disposed along the angled cavity walls 48. The anode 26 connects to top ends of the angled bow-tie sections 30' along a top surface of the raised portion 50. The cathode 28 connects to bottom portions of the angled bow-tie sections 30' at a bottom of the cavity 46.

Those skilled in the art will appreciate that the raised portion 50 may be omitted in certain applications. For example, the cavity 46 may be formed in a substantially planar polymer. Alternatively, the raised portion 50 and/or the cavity 46 may have a square, triangular, or other form factor.

In operation, the multiple bow-tie sections 30' are heated by application of sufficient voltage across the sections 30' via the conductors 26, 28. Energetic (not shown) that is disposed in the cavity 46 is ignited by the bow-tie sections 30'. The resulting explosion, which emanates from the sidewalls 48, is forced inward and upward due to the angled sidewalls 48. This results in a relatively large and enhanced shock wave emanating from the cavity 46. The resulting shock wave is particularly useful in munitions applications, where the microcavity actuator 40 is employed to selectively detonate secondary explosives.

In accordance with an embodiment of the present invention, the cavity 46 is formed via a unique low-temperature lithographic spin process, which enables the formation of the angled sidewalls 48. The spin process involves the following steps: obtaining a photo-curable polymer; disposing the polymer on a substrate; positioning a mask over the substrate; angling the mask and substrate at a predetermined angle relative to an energy source adapted for use with the polymer; and spinning the mask and substrate at the angle while exposing the mask and substrate to the energy source.

When the polymer is photo-curable epoxy, the energy source is a light source, such as an ultraviolet light source. Hence, in this case, the unique spin process involves angling a mask (not shown) and epoxy-coated substrate relative to a light source (not shown) and spinning the substrate and accompanying mask. Light impinges on the photo-curable epoxy at an angle corresponding to the angle of the sidewalls 48. Any exposed polymer that is sufficiently exposed to the light is then washed away (positive), yielding the cavity 46. In the same manner, this same technique could be applied to a negative polymer. Other methods, such as multiple polymer depositions using different sized masks may be employed to achieve arbitrary cavity shapes, without departing from the scope of the present invention. For example, gray-scale masks may be used to created parabolic cavities. Use of photo-curable epoxy or another suitable polymer to form the cavity 46 facilitates the use of the cost-effective unique spin process to achieve the angled sidewalls 48, which would otherwise be extremely difficult and expensive if not impossible to achieve in silicon using cost-effective conventional techniques.

Use of the angled sidewalls 48 results in certain shock wave and blast characteristics that are desirable for certain applications. Different cavity form factors may be employed to meet the needs of different applications without departing from the scope of the present invention.

Figure 4:
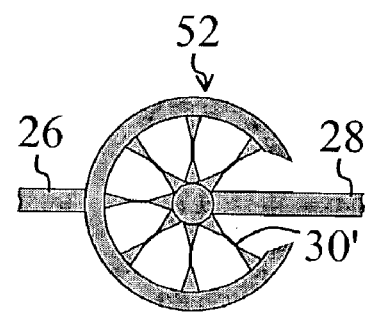
FIG. 4 is a top view of the unique heater of FIG. 3.

FIG. 4 is a top view of the unique heater 52 of FIG. 3. With reference to FIGS. 3 and 4, the anode 26 and cathode 28 extend over the raised portion 50 and may be easily routed to appropriate contact pads (not shown). In FIG. 3, the bow-tie sections 30' are angled to conform to the sidewalls 48. However, the bow-tie sections 30' may be disposed in the bottom of the cavity 46 in a radial formation such that the bow-tie sections 30' are approximately flat rather than angled. In this case, the heater design 52 would still provide advantages over conventional bridge wire heaters, since more heating bow-tie sections 30' are exposed to energetic material, and the actuator 40 does not require expensive and precise energetic deposition methods to achieve acceptable dud rates. Furthermore, the shape of the heater 52 may provide more desirable blast characteristics.

Figure 5:
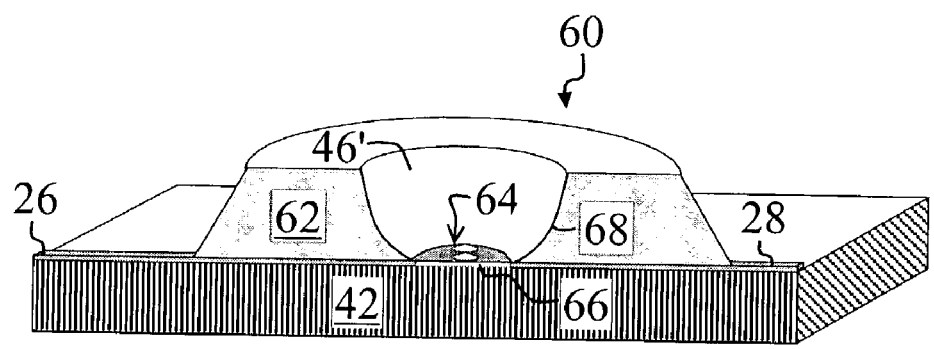
FIG. 5 is a diagram of a third alternative embodiment of a microcavity actuator incorporating a raised heater and parabolic sidewalls constructed in accordance with the teachings of the present invention.

FIG. 5 is a diagram of a third alternative embodiment of a microcavity actuator 60 incorporating a raised heater 64 and parabolic sidewalls 68 constructed in accordance with the teachings of the present invention. The microcavity actuator 60 incorporates a parabolic cavity 46', which is formed in the center of a raised ring of polymer 62, which has an isosceles trapezoidal cross-section. The polymer ring 62 is disposed on top of the substrate 42 and conductors 26, 28. The anode 26 and cathode 28 conductors pass under the polymer ring 62 and connect to the raised heater 64 disposed in the cavity 46.

The raised heater 64 is a multi-bow-tie heater, similar to the heater 22 of FIG. 2, but having a partially circular form factor. The heater 64 is suspended from the substrate 42, forming a hollow space 66 under the heater 64. The hollow space 66 may accommodate an additional oxidizing agent to facilitate detonation of accompanying energetic (not shown). Furthermore, the space 66 may act as an insulator between the heater 64 and the substrate 42. The raised heater 64 may be suspended by conductor material of the anode 26 and cathode 28. The hollow space 66 may be formed via well-known Micro Electromechanical Systems (MEMS) processes and techniques.

Use of the parabolic cavity 46' may result in more focused blast energy, which converges at the focal point of the parabolic cavity 46. The parabolic cavity 46 has a parabolic cross-section designed so that the focal point occurs at a desired elevation from the substrate 42. The cross-sectional form factor of the cavity 46' as a function of the location of the focal point is described by the following equation:

$$y = \frac{1}{4p}x^2, \quad [1]$$

where x and y are horizontal and vertical Cartesian Coordinate variables, respectively, for a coordinate system wherein the y-axis extends vertically through the parabolic cavity 46', and the x-axis extends horizontally, parallel to the surface of the substrate 42. The origin corresponds to the vertex of the parabolic cavity 46', which is slightly below the bottom of the cavity 46' and the surface of the substrate 42. p represents the elevation of the focal point of the parabola above the origin.

One skilled in the art may employ equation (1) to adjust the shape of the cavity 46' to precisely tailor the location of the focal point relative to the cavity 46' to focus blast energy. Blast energy may now be focused toward a single point and not just in a certain direction. This is particularly useful in initiator applications and materials-destruction applications, where concentrated blast energy is important. For example, in munition initiator applications, focused blast energy may more readily detonate secondary explosives.

The parabolic cavity 46' may also be formed via a multiple masking process using successive masking steps with successively different shaped masks. The multiple masking process may result in a small staircase pattern along the parabolic sidewalls 68. In some applications, the additional staircase pattern may desirably affect the way blast energy is focused and directed toward the focal point of the parabolic cavity 46'.

In an illustrative embodiment (not shown), the parabolic polymer cavity 46' is fitted wit the heater 52 of FIG. 3 or a modification thereof. In this application, polymer embossing may be employed to first form the cavity 46' and then form metal components, such as the heater 52, on the surface of the cavity 46'. If desired, the use of polymer embossing may be employed to eliminate staircase patterns on the parabolic sidewalls 68. In an exemplary polymer embossing process, the polymer material 62 is heated and then stamped to form the parabolic cavity 46'. Since polymers often have relatively low melting points, this type of polymer embossing may remain a relatively low-temperature process that is compatible with many substrates.

Figure 6:
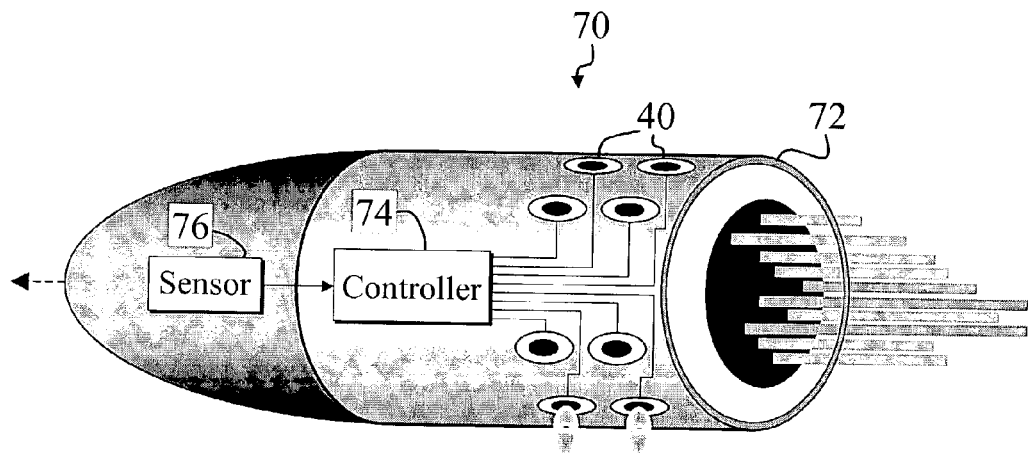
FIG. 6 is a diagram illustrating a smart bullet incorporating an array of the miniature cavities of FIG. 3 mounted on a conformal skin of the smart bullet.

FIG. 6 is a diagram illustrating a smart bullet 70 incorporating an array of the miniature cavities 40 of FIG. 3 mounted on a conformal skin 72 of the smart bullet 70. A controller 74 is connected to each microcavity actuator 40 and receives input from a sensor 76.

In operation, the sensor 76, which may be an inertial reference unit or other type of sensor, provides trajectory or targeting information to the controller 74. The controller 74 runs algorithms that determine trajectory correction factors based on the trajectory information from the sensor 76. The controller 74 then applies appropriate voltages to selected microcavity actuators 40 to detonate the actuators in accordance with the trajectory correction factors. The actuators 40 produce forces that help adjust the trajectory of the bullet 70 to a desired trajectory.

Alternatively, the sensor 76 and controller 74 may be replaced with a receiver or transceiver (not shown) that is responsive to control signals that are wirelessly transmitted from a separate bullet guidance system, such as a ground-based bullet tracking and guiding system.

Use of the unique microcavity actuators, such as the microcavity actuators 40, facilitates disposing the actuators 40 about the surface of the bullet 70. The actuators 40 may be integrated on the conformal skin 72, which is then wrapped around the bullet 70.

Figure 7:
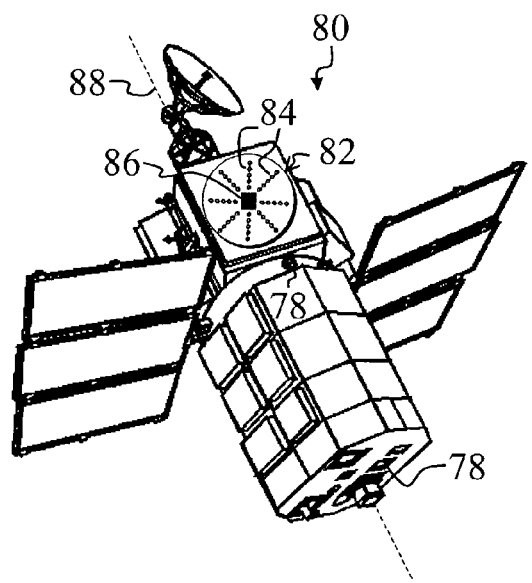
FIG. 7 is a diagram of a micro satellite employing a position and attitude control array that incorporates micro thrusters and is constructed in accordance with the teachings of the present invention.

FIG. 7 is a diagram of a micro satellite 80 employing a micro satellite position and attitude control array 82 that incorporates radially disposed micro thrusters 84 and is constructed in accordance with the teachings of the present invention. The array 82 includes a controller 86 that facilitates satellite attitude and position control by selectively firing the thrusters 84. The thrusters 84 may be constructed similarly to the microcavity actuators of FIGS. 1, 3, or 5 or alternative embodiments thereof.

In the present specific embodiment, the array 82 is approximately centered over a longitudinal axis 88 of the satellite. Firing thrusters 84 on either side of the array 82 will create moments about the longitudinal axis 88 and may also create lateral moments about a lateral axis or other axis (not shown). Thrusters 84 that are positioned closer to the center of the array 82 are designed to produce a more powerful thrust than those disposed further from the center of the array 82. The thrusting strength of the microcavity thrusters 84 are chosen so that the thrusters 84 produce equivalent moments about the center of the array 82 when fired. For example, when an outer most thruster 84 is fired, the resulting moment about the center of the array 82 will be similar to the moment created by firing a closer thruster in the same line of thrusters 84. This greatly simplifies attitude control and position control calculations performed by the controller 86.

An additional array (not shown) may be mounted on the satellite at a different angle, such as perpendicularly to the array 82, to provide an additional degree of freedom to further control the position and orientation of the satellite 80. The controller 86 may receive feedback from various sensors 78, such as micro-gyroscopic sensors 78 mounted on or within the satellite 80. Gyroscopic sensors 78 can detect minute shifts in satellite orientation and provide appropriate signals to the controller 86 in response thereto. The controller 86 then determines which of the thrusters 84 to fire based on a predetermined algorithm.

Figure 8:
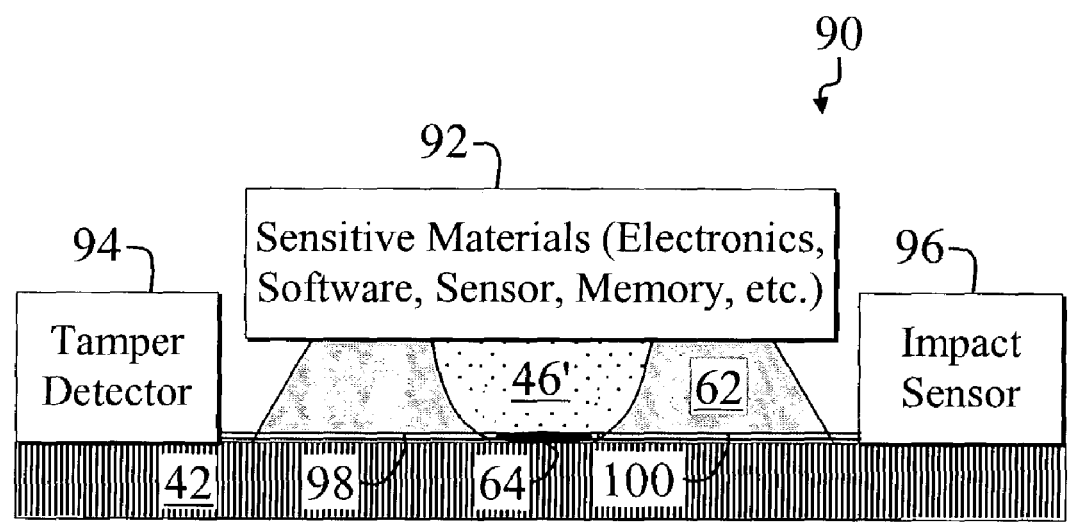
FIG. 8 is a diagram of a system for selectively destroying sensitive material according to an embodiment of the present invention that employs the microcavity of FIG. 5.

FIG. 8 is a diagram of a system 90 for selectively destroying sensitive materials 92 according to an embodiment of the present invention that employs the microcavity 46' of FIG. 5. In the present specific embodiment, the sensitive materials 92, such as electronics, software, sensors, memory, or other materials, are mounted atop the explosives-filled microcavity 46', which is formed atop the substrate 42. A tamper detector 94 and an impact sensor 96 are also mounted on the substrate 42. The tamper detector 94 is connected to the heater 64 via a first anode and cathode pair 98. A second anode and cathode pair 100 connect the heater 64 with the impact sensor 96.

In operation, explosives in the microcavity 46' are selectively detonated via the tamper detector 94 or the impact sensor 96. The tamper detector 94 detects tampering of the sensitive materials 92 and activates the heater 64 in response thereto. The impact sensor 96 determines when a vehicle, such as an aircraft, accompanying the system 90 has crashed; or has experienced another jolting event that might expose the sensitive materials 92 to tampering or reverse engineering. The tamper detector 94 or the impact sensor 96 may be omitted without departing from the scope of the present invention.

The sensitive materials 92 may be positioned in a different location, rather than directly over the cavity 46', without departing from the scope of the present invention. For example, the sensitive materials 92 may be integrated on the substrate 42, and a thin layer of energetic may be disposed over the entire substrate 42 including in the cavity 46'. Activation of the heater 64 would then result in a larger explosion, thereby destroying the sensitive materials 92. Other types of secondary charges may be employed to destroy the sensitive materials 92 without departing from the scope of the present invention.

In an alternative embodiment, a controller (not shown) processes inputs from the tamper detector 94 and impact sensor 96 in accordance with a predetermined algorithm and detonates the explosives in accordance with the results of the processing.

Microcavities constructed in accordance with the teachings of the present invention are particularly applicable to destroying sensitive materials. The microcavities are compatible with post Very Large Scale Integrated (VLSI) circuit processing and may be integrated with and/or disposed on top of and/or beneath existing sensitive materials 92 without prematurely destroying them during cavity manufacturing.

Thus, the present invention has been described herein with reference to a particular embodiment for a particular application. Those having ordinary skill in the art and access to the present teachings will recognize additional modifications, applications, and embodiments within the scope thereof.

It is therefore intended by the appended claims to cover any and all such applications, modifications and embodiments within the scope of the present invention.

What is claimed is:

1. An efficient cavity actuator comprising:

a cavity having one or more polymer-based sidewalls;

energetic material disposed within said cavity and adjacent to said one or more polymer-based sidewalls; and a heating element disposed on, within, or adjacent to said energetic material, wherein said heating element includes a resistor disposed on said one or more polymer-based sidewalls and positioned within said cavity to provide desired energetic material blast and/or burn characteristics, said cavity actuator being an initiator and wherein said cavity actuator includes a microcavity constructed via a special microelectromechanical process characterized by processing temperatures sufficiently low to enable said cavities to be deposited on or integrated with integrated circuits.

2. The cavity actuator of claim 1 wherein said special microelectromechanical process includes multiple masking steps for achieving custom-shaped sidewalls for optimal blast energy and resulting shock wave shape for a given application.

3. An efficient cavity actuator comprising:

a cavity having one or more polymer-based sidewalls;

energetic material disposed within said cavity and adjacent to said one or more polymer-based sidewalls;

a heating element disposed on, within, or adjacent to said energetic material; and further including an array of said cavity actuators, wherein said array is disposed on a conformal skin, said conformal skin being a covering or layer whose shape is adaptable to an underlying structure upon which said conformal skin is disposed.

4. An efficient cavity actuator comprising:

a cavity having one or more polymer-based sidewalls;

energetic material disposed within said cavity and adjacent to said one or more polymer-based sidewalls;

a heating element disposed on, within, or adjacent to said energetic material; and further including an array of said cavity actuators, wherein each of said cavity actuators of said array is in electrical communication with a controller for selectively actuating said cavity actuators to produce a desired moment about an axis, said desired moment about said axis affecting motion of said projectile.

5. A miniture device for creating a blast comprising:

first means for accommodating an explosive charge wherein said means for accommodating an explosive charge includes a cavity having polymer-based sidewalls and second means for initiating said explosive charge, said second means including a heater having plural heating elements in proximity to and/or in contact with said explosive charge, and wherein said plural heating elements are disposed around an inner sidewall surface of said cavity.

6. An efficient cavity actuator comprising:

a cavity formed in an insulating polymer and means for creating an enhanced shock wave emanating from said cavity, wherein said means for creating an enhanced shock wave includes parabolic sidewalls in said cavity, and wherein said means for creating an enhanced shock wave includes a heater disposed along sidewalls of said cavity, and wherein said cavity includes explosives disposed therein, and wherein said means for creating an enhanced shock wave further includes one or more sidewalls that are not perpendicular to an aperture of said cavity actuator.

7. An efficient microcavity actuator comprising:

a cavity formed in an insulating polymer and a heater having plural heating elements disposed about sidewalls of said cavity.

* * * * *